United States Patent [19]

Handlos

[11] Patent Number: 5,475,798
[45] Date of Patent: Dec. 12, 1995

[54] SPEECH-TO-TEXT TRANSLATOR

[75] Inventor: Thomas A. Handlos, Grosse Pointe Woods, Mich.

[73] Assignee: Handlos, L.L.C., Grosse Pointe Woods, Mich.

[21] Appl. No.: 817,387

[22] Filed: Jan. 6, 1992

[51] Int. Cl.$^6$ .................................................. G10L 9/00
[52] U.S. Cl. ........................................ 395/2.86; 395/2.79
[58] Field of Search ............. 381/41–53; 395/2.79–2.87, 395/2.4–2.66

[56] References Cited

U.S. PATENT DOCUMENTS

| | | | |
|---|---|---|---|
| 4,389,109 | 6/1983 | Taniguchi et al. | 354/60 L |
| 4,507,750 | 3/1985 | Frantz et al. | 381/41 |
| 4,613,944 | 9/1986 | Hashimoto et al. | 381/51 |
| 4,707,857 | 11/1987 | Marley et al. | 381/43 |
| 4,707,858 | 11/1987 | Fette | 381/43 |
| 4,718,096 | 1/1988 | Meisel | 381/43 |
| 4,749,353 | 6/1988 | Breedlove | 381/37 |
| 4,761,815 | 8/1988 | Hitchcock | 381/43 |
| 4,763,278 | 8/1988 | Rajasekaran et al. | 381/41 |
| 4,829,576 | 5/1989 | Porter | 381/43 |
| 4,866,778 | 9/1989 | Baker | 381/43 |
| 4,972,486 | 11/1990 | Cornett et al. | 381/48 |
| 4,975,962 | 12/1990 | Oka | 381/43 |
| 4,984,177 | 1/1991 | Rondel et al. | 395/2 |

Primary Examiner—Allen R. MacDonald
Assistant Examiner—Michelle Doerrler
Attorney, Agent, or Firm—Barnes, Kisselle, Raisch, Choate, Whittemore & Hulbert

[57] ABSTRACT

A device for assisting communication that comprises a generally rectangular enclosure of a size constructed and adapted to be held in a user's hand. A microphone is positioned within the enclosure for receiving speech acoustics and converting such acoustics into corresponding electrical signals. Information correlating speech with alphanumeric text is prestored in electronic memory positioned within the enclosure, and the speech signals received from the microphone are correlated with corresponding text in memory. A liquid crystal display (LCD) on one wall of the enclosure displays the alphanumeric text to the user substantially in real time.

7 Claims, 2 Drawing Sheets 5,475,798

SPEECH-TO-TEXT TRANSLATOR

The present invention relates to devices for receiving and translating speech acoustics into readable alphanumeric text, and more particularly to a band-held device of the described character suitable for use in assisting communication by the hearing impaired.

BACKGROUND AND SUMMARY OF THE INVENTION

Communication with others can be difficult for the hearing impaired, particularly those who have not learned to lip read or in communication with those that do not know sign. With the prevalence of foreign travel, there is also a need for a compact device for translating languages. A general object of the present invention is to provide an electronic device that can assist communication by persons in these situations by receiving and translating speech into text and displaying the text for the user. Another and more specific object of the present invention is to provide a device of the described character that is portable, battery-operated and constructed to be held in the hand of a user to receive speech acoustics and display corresponding text substantial in real time. Another and related object of the invention is to provide a device of the described character with facility and/or accessories for use in conjunction with telephone, radio or TV communication, or for unobtrusive display of text on a lens of eyeglasses or the like.

A device for assisting communication in accordance with the present invention comprises a generally rectangular enclosure of a size constructed and adapted to be held in a user's band. A microphone is positioned within the enclosure for receiving speech acoustics and converting such acoustics into corresponding electrical signals. Information correlating speech with alphanumeric text is prestored in electronic memory positioned within the enclosure, and the speech signals received from the microphone are correlated with corresponding text in memory. The electronic memory preferably comprises a magnetic disk memory of a type for receiving differing disks containing vocabulary suitable for differing occasions. A liquid crystal display (LCD) on one wall of the enclosure displays the alphanumeric text to the user.

The microphone and display are positioned on differing walls of the enclosure, preferably opposed major or top and bottom walls of the enclosure, so that the device may be oriented with the microphone directed toward a speaker and the display facing the user. Electric power is provided by batteries replacably contained within the enclosure. As an accessory, a second microphone is adapted to be mounted on a telephone, radio, television or the like, and is coupled by a cord and a jack in a sidewall of the enclosure to the device electronics for assisting the user in communication over the telephone, or in listening to the radio or TV. As a second accessory, a pair of conventional eyeglasses are provided with a liquid crystal display on one or both lenses of the eyeglasses, and are connectable through a jack on the sidewall of the device for so-called "heads up" display of the text to the eyeglass wearer.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
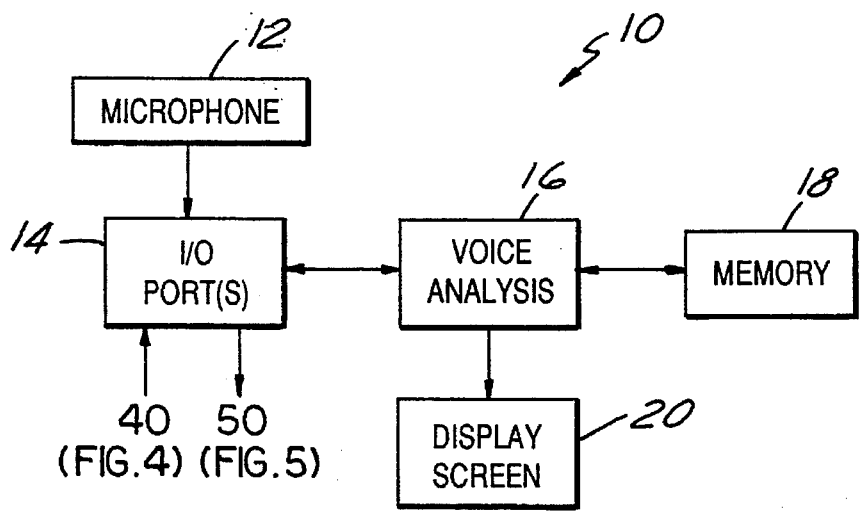
FIG. 1 is a functional block diagram of a device in accordance with a presently preferred embodiment of the invention.

FIG. 1 is a functional block diagram of a device 10 in accordance with a presently preferred embodiment of the invention. A microphone 12 is connected through I/O ports 14 to a voice analysis processor 16. Processor 16 is also connected to an electronic memory 18, and to a liquid crystal display (LCD) screen 20. Microphone 12 may be of any conventional type suitable for receiving speech acoustics and translating such acoustics into corresponding electrical signals. Memory 18 has prestored therein information that correlates electrical speech signals with corresponding alphanumeric text. In a presently preferred embodiment of the invention, memory 18 comprises a disk drive constructed for removably receiving individual magnetic disks having such information prestored thereon. It will be recognized, however, that other suitable memory devices, such as ROMs, PROMs, EAROMs, EPROMs and EEROMs may also be employed.

Voice analysis processor 16 preferably is micro-processor based with suitable on-board programming for receiving and sampling the speech signals from microphone 14, and accessing memory 18 to obtain corresponding text. The text is fed by voice analysis processor 18 to LCD display screen 20, at which the text is displayed to the user. Thus, the device 10 illustrated in FIG. 1 receives and translates speech acoustics into readable alphanumeric text substantially in real time.

Figure 2:
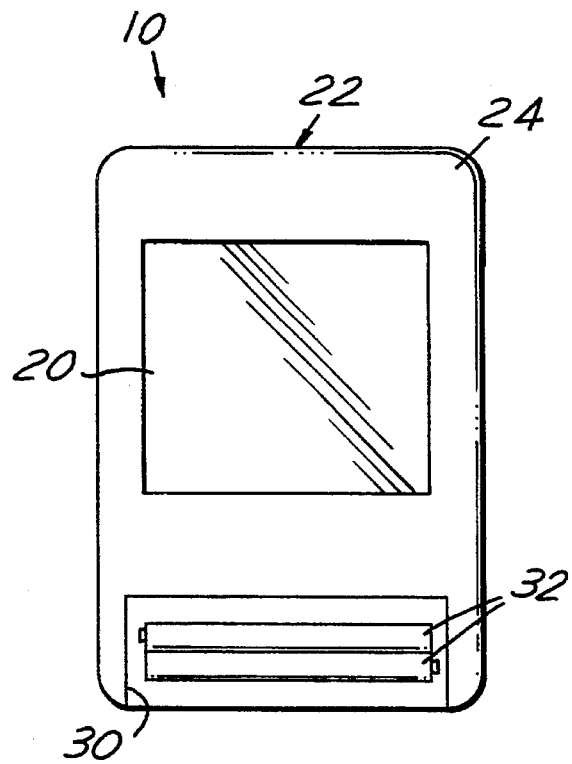
FIG. 2 is a top plan view of the device illustrated functionally in FIG. 1.
Figure 3:
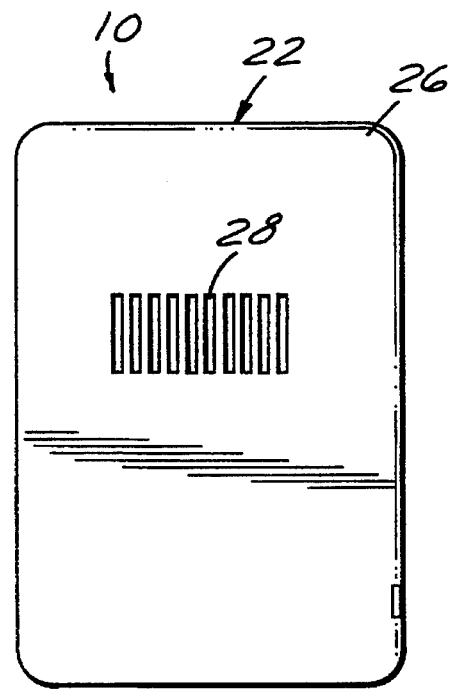
FIG. 3 is a bottom view of the device illustrated in FIG. 2.

FIGS. 2 and 3 illustrate the physical construction of device 10 in accordance with a presently preferred embodiment of the invention. The device preferably is contained within a substantially rectangular enclosure 22 having opposed main or top and bottom walls 24,26, and four side or edge walls. Microphone 12 (FIG. 1) is positioned within enclosure 22 beneath a louvered or slatted opening 28 in wall 26. LCD display screen 20 is positioned approximately centrally of wall 24, and thus is oriented oppositely of microphone 12. Enclosure 22 also includes a suitable cover that may be removed to expose a compartment 30 containing replaceable batteries 32 for supplying electrical power to device 10.

Figure 4:
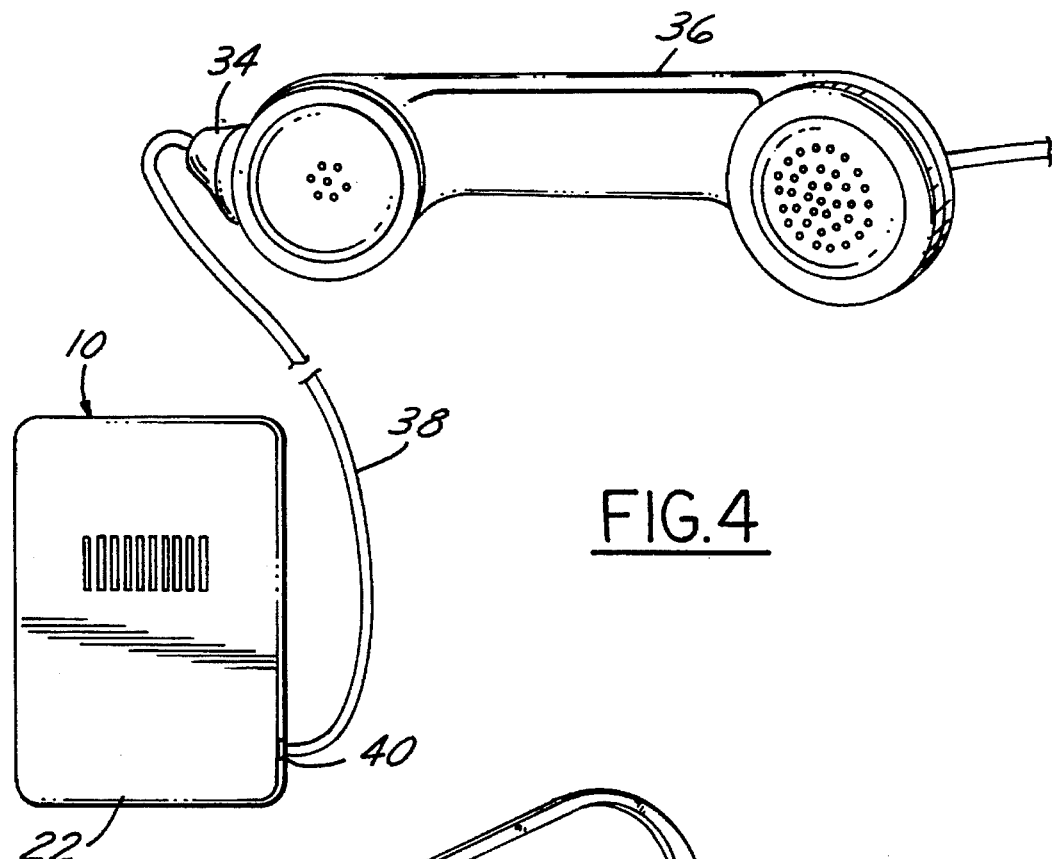
FIG. 4 is an elevational view of the device in accordance with the invention operatively coupled to a telephone handset.

FIG. 4 illustrates device 10 in accordance with a presently preferred embodiment of the invention with an accessory that includes a microphone 34 with suction cup or the like suitable for mounting the microphone on the handset 36 of a telephone. Microphone 34 is connected by a suitable cable 38 to a jack 40 on a sidewall of enclosure 22, and thence within enclosure 22 to I/O ports 14 (FIG. 1). Thus, the device may be connected to telephone handset 36 as shown in FIG. 4, and screen 20 (FIGS. 1 and 2) is oriented toward the user so that the user may see on screen 20 text corresponding to the speech of the person at the other end of the telephone line. Microphone 34 and cable 38 may also be used to "listen" to radio or TV.

Figure 5:
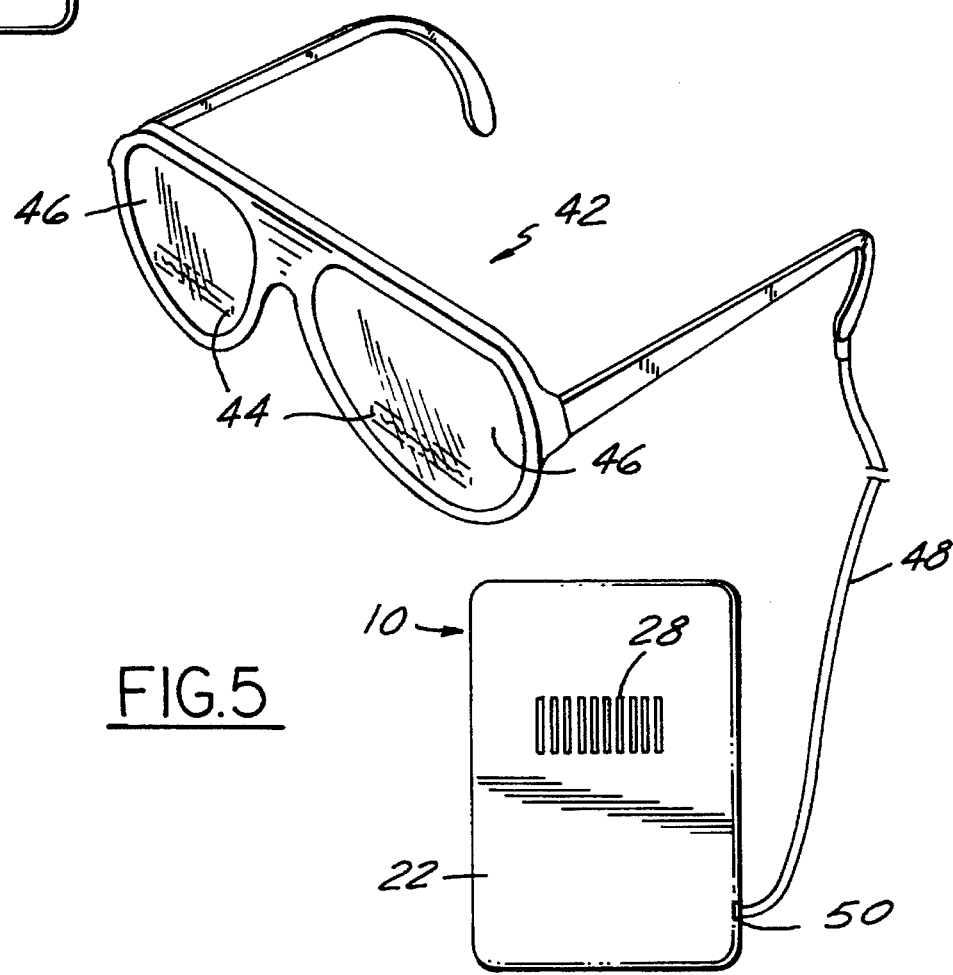
FIG. 5 is an elevational view of the device of the present invention operatively coupled to a pair of eyeglasses.

FIG. 5 illustrates device 10 in conjunction with another accessory that includes a pair of eyeglasses 42 with suitable alphanumeric displays 44 on one or both of the lenses 46 of the eyeglasses. Displays 44 are so-called "heads-up" displays in which the text generated by voice analysis processor 16 (FIG. 1) is displayed in a manner suitable for viewing by the wearer of the eyeglasses with eyes focused at infinity. Eyeglass displays 44 are coupled by a suitable cable 48 to a jack 50 on the sidewall of unit enclosure 22. Thus, enclosure 22 may be placed in a user's pocket, for example, with microphone opening 28 pointing outwardly of the wearer, and text will be unobtrusively displayed on eyeglasses 36 worn by the user. It will be recognized that either or both of the cables 38,48 (FIGS. 4 and 5) may be replaced by suitable wireless communication means.

There bas thus been disclosed in accordance with the present invention a device for assisting communication by the hearing impaired that fully satisfies all of the objects and aims previously set forth. The device is small and portable, being of a size suitable for holding in the hand of a user. For example, enclosure 22 may be approximately 4" long, approximately 2½" wide and approximately ½" thick. Enclosure 22 may be constructed of economical molded plastic composition, and the unit electronics contained on a suitable circuitboard assembly or the like mounted within the enclosure. Memory 18 preferably is readily removable and replaceable by a user so that the user may provide a vocabulary suitable for any occasion. A replaceable magnetic disk memory of the type presently preferred may readily store literally thousands of words and phrases that may be translated and displayed to the user. The disk may be programmed employing conventional technology. The memory may be programmed for translating one language to another, such as Russian to English. In another modification not illustrated in the drawings, voice analysis processor 16 may be connected through ports 14 and a suitable jack to a printer for printing memos or letters.

I claim:

1. A device for translating speech to text that comprises:

a rectangular enclosure of a size constructed and adapted to be held in a user's hand, a microphone within said enclosure adjacent to a wall opening in said enclosure for receiving speech acoustics and converting said acoustics to electrical speech signals, electronic memory means within said enclosure having prestored therein information correlating speech with alpha numeric text corresponding to such speech, means coupled to said memory means and responsive to said speech signals for obtaining from said memory means alphanumeric text corresponding to said speech signals, and display means in one wall of said enclosure and responsive to said means coupled to said memory means for displaying said alphanumeric text corresponding to said speech signals in real time, wherein said display means and said microphone opening are located at respective walls of said rectangular enclosure that are opposed to each other.

2. The device set forth in claim 1 wherein said display means comprises an LCD.

3. The device set forth in claim 1 further comprising at least one battery within said enclosure for providing electrical power to said device.

4. The device set forth in claim 1 wherein said electronic memory means comprises a magnetic disk drive.

5. The device set forth in claim 1 further comprising a second microphone disposed externally of said enclosure and means for removably affixing said microphone to a telephone, radio or television for receiving speech acoustics therefrom, and a lack on said enclosure for removably connecting said second microphone to said means responsive to said speech signals.

6. The device set forth in claim 1 further comprising second display means having eyeglasses with means on at least one lens of said eyeglasses for displaying said text to a wearer, and means in said enclosure for operatively connecting said eyeglasses to said memory means.

7. A device for translating speech to text that comprises:

a rectangular enclosure of a size constructed and adapted to be held in a user's hand, means in said enclosure for receiving speech acoustics and converting said acoustics to electrical speech signals, electronic memory means within said enclosure having prestored therein information correlating speech with alphanumeric text corresponding to such speech, means coupled to said memory means and responsive to said speech signals for obtaining from said memory means alphanumeric text corresponding to said speech signals, and display means in one wall of said enclosure and responsive to said means coupled to said memory means for displaying said alphanumeric text corresponding to said speech signals in real time, wherein said means for receiving speech acoustics includes a microphone disposed externally of said enclosure, means for removably affixing said microphone to a telephone, radio or television for receiving speech acoustics therefrom, and a jack on said enclosure for removably connecting said microphone to said means responsive to said speech signals.

* * * * *